Aug. 12, 1969    F. A. DAVIS, JR    3,460,441
THERMOPLASTIC BAG MANUFACTURING APPARATUS
Filed Nov. 28, 1967    2 Sheets-Sheet 1
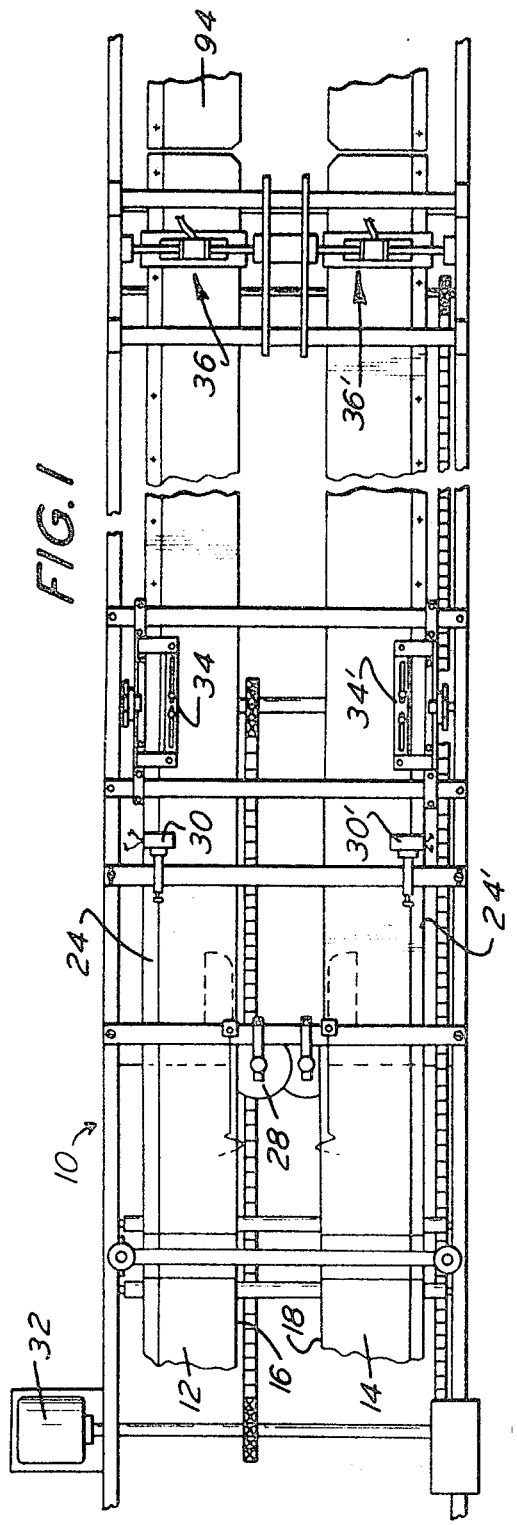
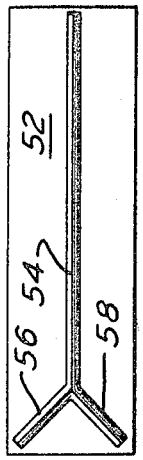
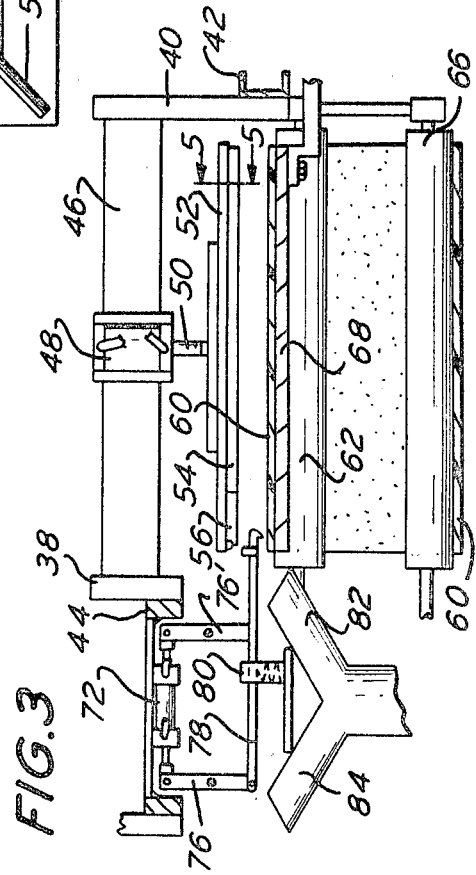
INVENTOR
FRANCIS A. DAVIS, JR.
BY *Seidel & Gonda*
ATTORNEYS.

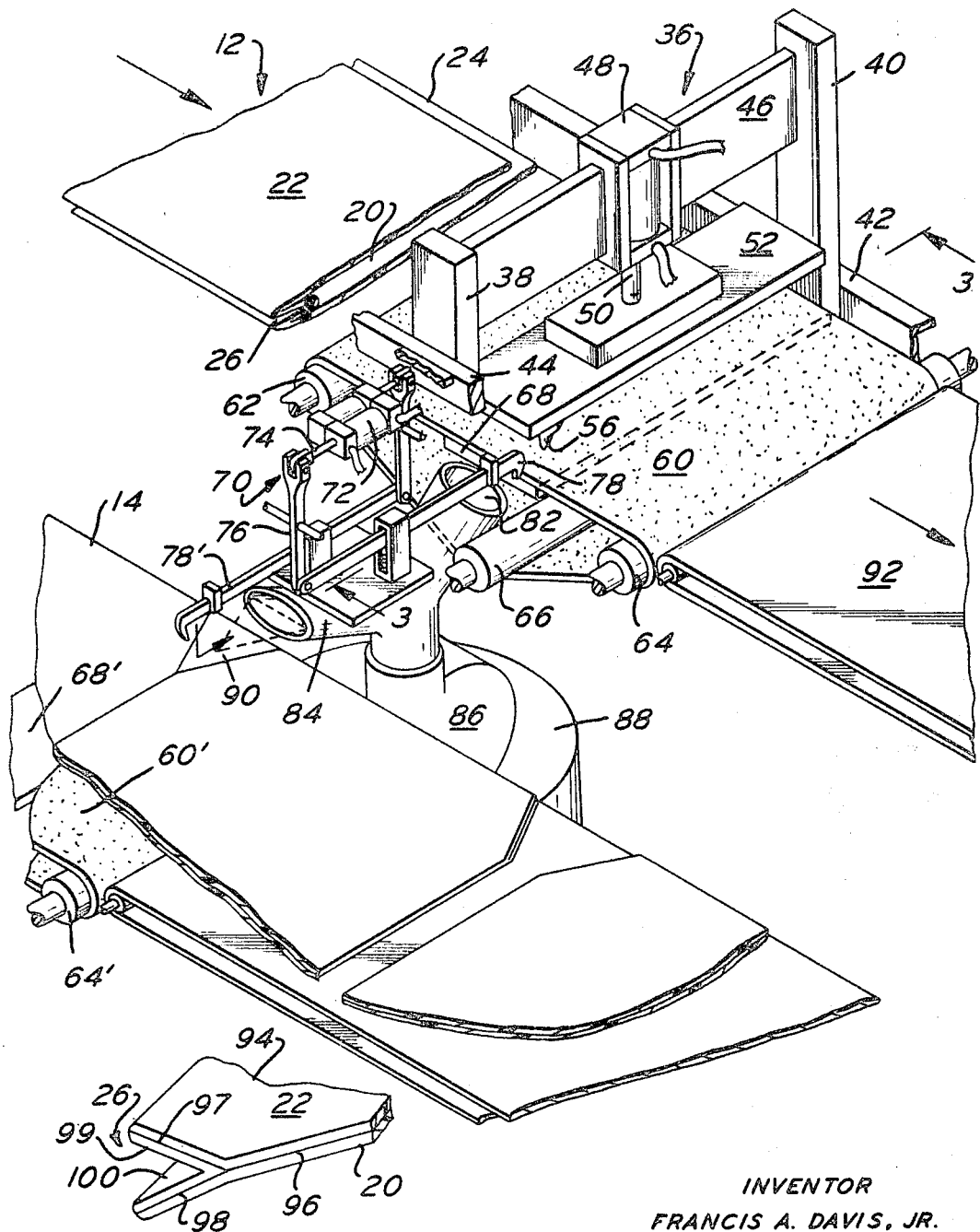

United States Patent Office 3,460,441
Patented Aug. 12, 1969

3,460,441
THERMOPLASTIC BAG MANUFACTURING
APPARATUS
Francis A. Davis, Jr., Lansdale, Pa., assignor to Paramount Packaging Corp., Chalfont, Pa., a corporation of Delaware
Filed Nov. 28, 1967, Ser. No. 686,202
Int. Cl. B31b 49/04, 1/14, 1/64
U.S. Cl. 93—8          5 Claims

ABSTRACT OF THE DISCLOSURE

Thermoplastic bag manufacturing apparatus wherein bags are formed by cutting an overlapping web having a gusset along the fold line at spaced points along the web. The cutting of the web into bags is accomplished by a heated knife which has a generally Y-shape. Everytime a bag is cut, a cut-out tab is formed and means are provided for removing the tabs.

---

The present invention relates to thermoplastic bag manufacturing apparatus of the type disclosed in my prior Patent 3,282,173. The bags produced and made from a polymeric plastic material are side weld open gusset bottom bags. The bags produced by said patent are closed bottom gusset bags. The side welds on the bags produced by the apparatus of the present invention are so strong that the strength of the welds exceeds the strength of the material. This is true even though the gusset portion of the bag involves four thicknesses of material while the remainder of the bag only involves two thicknesses of material.

The open bottom gusset bags made on the apparatus of the present invention have a Y-shaped weld along their opposite sides. The converging legs of the Y-shaped weld are of sufficient length so that they intersect at a point which is spaced from the bottom of the bag by a distance which is equal to or slightly greater than the width of the gusset.

The apparatus of the present invention includes a device for continuously forming a gusset along the fold line of an overlapping web. The thusly shaped web is intermittently fed to a heated knife positioned to cut the web transversely at spaced points and simultaneously form side welds. The knife is mounted for up and down movement toward and away from the web. The knife is generally Y-shaped. A means is provided for removing the cut-out tabs formed by the converging legs of the Y-shaped knife.

The removal means is preferably in the form of a rod-shaped member synchronized for in and out movement with the up and down movement of the knife. That is, the rod moves into the space between the converging legs of the knife when the knife comes down to cut the web.

It is an object of the present invention to provide a novel apparatus for making open bottom gusset side weld bags from a polymeric plastic material.

It is another object of the present invention to provide apparatus for making open bottom side weld gusset bags having rounded-off or beveled corners so that the side weld is Y-shaped and reliable.

It is another object of the present invention to provide apparatus for making open bottom gusset bags wherein the cutting, welding and tab removal are cooperatively associated and synchronized.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a partial top plan view of the apparatus of the present invention.

FIGURE 2 is a partial perspective view of the apparatus showing in detail the cutting and side welding structure.

FIGURE 3 is a view taken along the line 3—3 in FIGURE 2.

FIGURE 4 is a bottom plan view of the knife.

FIGURE 5 is a sectional view taken along the line 5—5 in FIGURE 3.

FIGURE 6 is a partial perspective view of a completed bag with gusset opened.

Referring to the drawing in detail, wherein like numerals indicate like elements, there is shown in FIGURE 1 apparatus in accordance with the present invention designated generally as 10. The apparatus 10 includes a frame constructed in a manner so as to receive and intermittently accommodate first and second overlapped webs of thermoplastic material designated 12 and 14, respectively. Web 12 has a fold line 16 and web 14 has a fold line 18.

Since the machine accommodates two parallel webs in the same manner, only the portion of the machine dealing with web 12 will be described in detail. Corresponding primed numerals will be provided for web 14 and the components which cooperate with the same.

A gusset 26 is provided continuously along the fold line 16 on the web 12 by means of a continuously rotating disk 28. The thusly formed web has a bottom layer 20, top layer 22, with a projecting lip 24 on the bottom layer. See FIGURES 2 and 6. The webs 12 and 14 are provided with markers at spaced points therealong to be detected by photocell units 30 and 30'. The photocell units control the intermittent drive of the web feeding mechanism effected by motor 32 and operation of the cutter and tab remover as to be explained hereinafter.

Intermittently operated perforator units 34 and 34' intermittently provide spaced slits in the lips 24 and 24'. The perforator units may be of the type disclosed in my prior Patent 3,183,750 for the purpose of providing slits as shown therein. Such perforator units operate intermittently to slit the lips when the webs are stationary.

The thusly formed webs are intermittently fed to the cutter units 36 and 36'. As shown more clearly in FIGURES 2 and 3, the cutter unit 36 includes uprights 38 and 40 connected, respectively, to frame portions 44 and 42. The uprights are connected together by a cross bar 46 which supports a cylinder 48.

The piston rod 50 projecting downwardly from the cylinder 48 is connected to the top of a knife holder 52. An electrically heated knife 54 is secured to the bottom surface on knife holder 52. Knife 54 is generally Y-shaped with converging legs 56 and 58. The legs 56 and 58 are sufficiently long so as to extend across the gusset 26. The knife 54 is sufficiently long in total length so as to extend transversely across the entire width of web 12.

An endless belt 60 is provided below the knife 54. Belt 60 extends around a driving roller 62, driven roller 64, and idler roller 66. Roller 62 is coupled to motor 32 so as to be intermittently driven thereby in synchronization with the other components driven by motor 32. In view of the heat involved in effecting a cutting of the webs and effecting a simultaneous side weld, belts 60 and 60' are preferably made from a silicone rubber material commercially available. A flat metal anvil 68 is disposed immediately below the knife 54 with a run of the belt 60 passing therebetween. Anvil 68 as well as the rollers 62, 64 and 66 are supported by the frame portions of the apparatus.

Since the converging legs 56 and 58 on the knife 54 extend across the gusset, everytime a cut is made transversely across the web, a triangular tab is produced by said legs. A tab remover designated generally as 70 is synchronized and cooperatively disposed with the cutter unit 36. The tab remover 70 includes a cylinder 72 having its piston rod 74 connected to a clevis at one end of an arm 76. Arm 76 is pivotably supported intermediate its ends. The end of arm 76 remote from the clevis is pivotably coupled to one end of a shuttle 78. Shuttle 78 extends through a spring housing 80 having a spring therein biasing the shuttle in a counterclockwise direction in FIGURE 3. The shuttle 78 at its other end terminates in a sharp point and adjacent thereto has an enlargement for contact with the lower surface on knife holder 52.

A conduit 82 is provided for receiving the V-shaped tab. A conduit 84 is provided for receiving the V-shaped tab 90 from the web 14. Conduits 82 and 84 each communicate with the inlet to a vacuum pump 86 mounted on a hollow drum 88 into which the tabs may be introduced from the outlet of the vacuum pump 88. A shredder may be provided in the tank 88 for shredding the tabs.

A conveyor 92 is provided as shown more clearly in FIGURE 2 to receive the open gusset bottom side welded bags 94 and convey the same away from the cutter unit 36. The bag 94 with the gusset opened up is shown in FIGURE 6. The side weld 96 has branch portions 97 and 98.

The operation of the apparatus 10 is as follows:

Webs 12 and 14 are continuously fed to the apparatus 10. The webs are intermittently fed toward the cutter units. Marks on the webs are detected by the photocell units which interrupt motor 32. The webs are continuously formed so as to provide a gusset at their fold lines with the webs being in the form of overlapping layers.

Each time that the web 12 is stationary, the perforator unit 34 provides slits in the lip 24. Also, when the web 12 is stationary, motive fluid will be introduced into cylinder 48 to move the knife 54 downwardly to simultaneously cut the web 12 transversely and effect a side weld to the cut portions of the web 12.

When the knife 54 moves downwardly, motive fluid is simultaneously introduced into the cylinder 72 which causes the arm 76 to move the shuttle 78 inwardly so that the free end of shuttle 78 is below the knife holder 52. As the knife holder 52 continues to move downwardly, it contacts the enlarged portion on the terminal end of shuttle 78 and moves it downwardly so that the point on the shuttle 78 digs into the gussetted portion of the web 12 at a location which will be part of the triangular shaped tab cut by the legs 58 and 56 of the knife 54. While the shuttle 78 pivots in a clockwise direction in FIGURE 3 due to contact with the knife holder 52, the spring in housing 80 is compressed slightly.

As soon as the web 12 commences to move again, motive fluid is introduced into cylinder 48 to retract the knife 54 and motive fluid is introduced into cylinder 72 to retract the shuttle 78. As the shuttle 78 retracts, it pulls the triangular shaped tab into the conduit 82 in which a suction is effected by way of pump 86. Pump 86 discharges the tab into tank 88. Conveyor 92 transports the bag 94 to a stacking area.

The branch portions 97 and 98 of the side weld are not to be confused with the Y shape of the weld produced by the knife. For example, both branch portions 97 and 98 on one bag were effected by leg 58. In order for the welds of branch portions 97 and 98 to be discrete and in order for the bags 94 to be capable of being opened by merely introducing pressurized air thereinto, surfaces 99 and 100 are coated with heat resistant ink, transparent shellac, etc.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for making bags from webs of polymeric plastic material comprising means for overlapping a web of plastic material on itself with one layer projecting beyond the other to define a longitudinally extending lip, means for continuously forming a gusset along the fold line of said overlapping web, means for intermittently moving the web, means for perforating said lip while the web is stationary and before the web is cut transversely, a heated knife for cutting the perforated web transversely at spaced points and simultaneously forming side welds on bags formed from said web while the web is stationary, said knife being generally Y-shaped with the converging legs thereof being of sufficient length to traverse the gusset, and reciprocating means for removing the cut-out tab of the gusset.

2. Apparatus in accordance with claim 1 wherein said reciprocating means is a reciprocable shuttle synchronized with the up and down movement of the knife so that the shuttle moves into the space between said converging legs when the knife moves down to cut the web.

3. Apparatus in accordance with claim 1 including an endless belt below said knife, an anvil below said belt, said belt being synchronized with the movement of the web so as to be stationary when the web is stationary.

4. Apparatus for making bags from webs of polymeric plastic material comprising means for continuously forming a gusset along a fold line of an overlapping web, a heated knife for cutting the web transversely at spaced points and simultaneously forming side welds on the bags, said knife being generally Y-shaped with the converging legs thereof being of sufficient length to traverse the gusset, a reciprocating shuttle synchronized with up and down movement of the knife so that the shuttle moves into the space between said converging legs when the knife moves down to cut the web, said shuttle removing the cut-out tab of a gusset, said shuttle having a pointed portion for engaging the cut-out tab, said shuttle having a contact surface for contact with a holder for said knife as the knife moves downwardly toward the web.

5. Apparatus in accordance with claim 4 including a container for receiving the cut-out tabs, a vacuum pump connected to the container, said vacuum pump having an inlet conduit disposed adjacent said shuttle for receiving the cut-out tabs.

References Cited

UNITED STATES PATENTS

| | | | |
|---|---|---|---|
| 2,765,713 | 10/1956 | Anness | 93—36 |
| 3,011,295 | 12/1961 | Brugger | 53—372 XR |
| 3,023,679 | 3/1962 | Piazze | 93—35 XR |

BERNARD STICKNEY, Primary Examiner

U.S. Cl. X.R.

83—151, 372; 93—35, 36; 156—267; 225—96